United States Patent
Bustan et al.

(10) Patent No.: US 12,437,141 B1
(45) Date of Patent: Oct. 7, 2025

(54) SYSTEM AND METHOD FOR FORMAL VERIFICATION OF A MULTI-CYCLE PATH CIRCUIT

(71) Applicant: Cadence Design Systems, Inc., San Jose, CA (US)

(72) Inventors: Doron Bustan, Zichron Yaakov (IL); Karam Abdelkader, Haifa (IL)

(73) Assignee: Cadence Design Systems, Inc., San Jose, CA (US)

(*) Notice: Subject to any disclaimer, the term of this patent is extended or adjusted under 35 U.S.C. 154(b) by 694 days.

(21) Appl. No.: 17/887,468

(22) Filed: Aug. 14, 2022

(51) Int. Cl.
*G06F 30/398* (2020.01)
*G06F 30/396* (2020.01)

(52) U.S. Cl.
CPC ......... *G06F 30/398* (2020.01); *G06F 30/396* (2020.01)

(58) Field of Classification Search
USPC ......................................................... 716/111
See application file for complete search history.

(56) References Cited

U.S. PATENT DOCUMENTS

2008/0216038 A1* 9/2008 Bose ............... G06F 30/392
716/118
2009/0254874 A1* 10/2009 Bose ............... G06F 30/39
716/113

* cited by examiner

*Primary Examiner* — Mohammed Alam
(74) *Attorney, Agent, or Firm* — Mark H. Whittenberger; Holland & Knight LLP

(57) ABSTRACT

Method includes, for a point in MCP circuit, performing backward traversal of the circuit along the COI of that point, to sequential elements directly driving that point; constructing a counter circuit for all sequential elements driving that point, and combining the constructed counter circuits to a combined logical circuit of all of the counters in the COI, to determine whether signals in the COI are stable; performing a fan out traversal of the MCP circuit from the selected point and up to next immediate sequential elements downstream in the fan out; constructing a combinational logic circuit for the combinational elements in the fan out to determine whether that combinational element blocks a signal of the signal paths when that signal is unstable, and combining the combinational logic circuits to a combined combinational logic circuit; and checking an assertion that inputs of the next immediate sequential elements are stable.

20 Claims, 7 Drawing Sheets

SYSTEM AND METHOD FOR FORMAL VERIFICATION OF A MULTI-CYCLE PATH CIRCUIT

FIELD OF THE INVENTION

The present invention relates to verification of electronic designs and more particularly to system and method for formal verification of a multi-cycle path circuit.

BACKGROUND

An electrical circuit that includes sequential elements (e.g., flip-flops, latches), combinational elements (e.g., gates) and a clock is typically referred to as a synchronous circuit.

At each edge of the clock, the sequential elements sample data at their input pins and set it on at their output pins. The time between two consecutive edges of the clock is typically referred to as the clock cycle time. In many cases, an electrical circuit depends only on the positive edge of a clock (e.g., posedge designs) In such cases, the negative edge is ignored and the time between one positive edge to the next positive edge is considered as the clock cycle. Setup time of a sequential element is typically defined as the minimal period of time before the next active edge of the clock that would take for the data on the input pins to be stable (that is, to remain unchanged) for it to be latched correctly. In other words, a flip-flop (or any other sequential element, in general) typically requires some time for the data to be stable before the next clock edge occurs, so as to reliably allow sampling of the data.

For a minimal period of time (also called: hold time) following the occurrence of an active edge of the clock (hereinafter also referred to as: "clock event") data should remain stable, to allow reliable sampling. Similarly to setup time, each sequential element typically needs some time for the data to remain stable after the occurrence of a clock edge to reliably capture that data.

When either the setup or hold times of an electrical circuit are not observed, a metastability may occur on the sequential element, and the circuit functionality may then be considered as undefined.

Combinational element delay is the longest period of time that passes between stabilization of data on the input pins and stabilization of the data on the output pin.

In some cases, the time delay is 0. For example, consider an AND gate for which both inputs are 0. When one of the input pins changes to 1, the output remains stable regardless of the time it took to the changed input pin to stabilized.

In a sequence of combinational elements, where the output pin each element is connected to an input pin of its proceeding element (also referred to as: combinational path), the longest period of time between stabilization of the data on the input pin of the first element and the stabilization of the data on the output pin of the last element on the path is the combinational path delay.

Typically, for every combinational path, the combinational path delay is greater than the sum of the combinational delays of its elements. When designing an electrical circuit attention is made to a critical path in a circuit, which is a combinational path with the longest delay. Typically, special care is provided to avoid extending a critical path by providing additional combinational elements. In most designs the sum of setup time, hold time and delay of the critical path, so that it is kept smaller than the cycle time of the clock. This is aimed at ensuring structurally that the data pins of the sequential elements are stable long enough to meet the required setup and hold times.

In combinational elements, "stable" is understood to mean that all of the electrical elements of the circuit that push data to that combinational element were stable for enough time to allow that combinational element to operate correctly.

There are also known electrical circuits which are designed to allow the delay to be greater than the cycle period, provided that the inputs in such circuit are kept stable. For example, when a multiplier has three inputs, the circuit may be designed such that the output is not sampled before completing three clock cycles during which all inputs were stable. In a multi-cycle path (MCP) circuit, the sum of setup time, hold time and delay of the critical path may be configured to be greater than the clock cycle period. In order to avoid metastability, MCP circuits are usually designed so as to ensure that the worst-case delay never occurs.

Verification is a common process of testing electronic designs (e.g., a newly designed integrated circuit, board, or system-level architecture), to, for example, confirm compliance with requirements that can be defined by a specification for that device.

In dynamic verification, the verification of electronic designs typically has several forms. At an early stage, before the electronic design is implemented in hardware, one form can include a simulation that can be conducted on a model of the design. Another form can be emulation, for example, in which one electronic hardware is used to mimic the behavior of another (e.g., a tested) electronic hardware. At more advanced stages of design development, another form of dynamic verification can test a system on chip that is verified, for example, in a process which is typically referred to as a post-silicon verification. Post-silicon verification can be a last stage in the electronic design development, for example, before it is commercially manufactured.

Formal verification, rather than subjecting a design under test (DUT) to numerous tests, is typically aimed at proving or disproving whether the DUT complies with a formal specification by, for example, using mathematics.

There are known simulation methods used for verifying a design of an electronic circuit that allows for delays of more than one clock cycle, but to-date there are no formal verification methods for verifying such designs.

It may be desired to provide a method and a system for formal verification of a design of an electronic circuit that allows for delays of more than one clock cycle (e.g., an MCP circuit.

SUMMARY OF THE INVENTION

There is thus provided, according to some embodiments of the present invention, a method for formal verification of a multi cycle path (MCP) circuit. The method includes obtaining information on a structure of a MCP circuit. The method also includes, for at least one selected point in the MCP circuit, performing backward traversal analysis of the MCP circuit along the cone of influence (COI) of each of the at least one selected point stopping at sequential elements directly driving that point; constructing a counter circuit for each of the sequential elements directly driving the at least one selected point, and combining the constructed counter circuits to a combined logic circuit of all of the counters in the COI, designed to determine whether signal paths in the COI are stable up to the at least one selected point. The method also includes performing a forward traversal analysis of the MCP circuit in a fanout from each of the at least one selected point and up to next immediate sequential elements downstream in signal paths found in the fanout; constructing a combinational logic circuit for each combinational element in the fanout to determine whether that combinational element blocks a signal of the signal paths when that signal is unstable, and combining the combinational logic circuits to the combined logic circuit of all of the counters in the COI of said at least one selected point to obtain a monitor circuit; and performing a formal verification to check an assertion that inputs of the next immediate sequential elements of the monitor circuit are stable at all times.

According to some embodiments of the present invention, the counter circuit for each of the sequential elements directly driving the at least one selected point is configured to count a minimal number of clock cycles that sequential element requires to be stable.

According to some embodiments of the present invention, the counter circuit for each of the sequential elements directly driving the at least one selected point is configured to count up to a highest a minimal number of clock cycles of a minimal number of clock cycles any of the sequential elements in the COI require to be stable.

According to some embodiments of the present invention, the sequential elements are flipflops.

According to some embodiments of the present invention, combining the constructed counter circuits to a combined logical circuit comprises creating a logic component ST(E) that represent a conjunction of terms (CNT(SE)=NC(E)) for all sequential elements in COI(E): ST(E)= $AND_{SE \in COI(E)}$(CNT(SE)=NC(E)).

According to some embodiments of the present invention, combining the combinational logic circuits to the monitor circuit comprises denoting FO(E) the set of combinational elements in the fanout of element E, denoting FOBE a subset of FO(E), such that an element is in FOB(E), if that element is in PO(E) and an output port of that element is connected to an input port of a sequential element.

According to some embodiments of the present invention the method further includes, for each element E2 in FO(E), creating a logic circuit ST(E) as follows: (i) ST (FO(E))=1 if one or more of the following exists: every driving port D of FO(E) has ST (D)=1; (ii) FO(E2) is a blocking gate, and the blocking port denoted B has ST (B)=1 and all input ports that are not blocked have ST (IP)=1.

According to some embodiments of the present invention, the method includes creating an assertion that always requires all elements in FOBE for all sequential elements of the MCP circuit to be 1.

According to some embodiments of the present invention, said at least one selected point comprises a plurality of points.

According to some embodiments of the present invention, there is provided a system that includes memory and a processor configured to: for at least one selected point in an MCP circuit: perform backward traversal analysis of a design of the MCP circuit along the cone of influence (COI) of each of the at least one selected point stopping at sequential elements directly driving that point; construct a counter circuit for each of the sequential elements directly driving the at least one selected point, wherein the counter circuit for each of the sequential elements directly driving that point is configured to count a minimal number of clock cycles that sequential element requires to be stable. and combine the constructed counter circuits to a combined logic circuit of all of the counters in the COI, designed to determine whether signal paths in the COI are stable up to the at least one selected point; perform a forward traversal analysis of the MCP circuit in a fanout from each of the at least one selected point and up to next immediate sequential elements downstream in signal paths found in the fanout; construct a combinational logic circuit for each combinational element in the fanout to determine whether that combinational element blocks a signal of the signal paths when that signal is unstable, and combine the combinational logic circuits to a combined combinational logic circuit of all of the counters in the COI of said at least one selected point to obtain a monitor circuit; and perform a formal verification to check an assertion that inputs of the next immediate sequential elements of the monitor circuit are stable at all times.

BRIEF DESCRIPTION OF THE DRAWINGS

In order to better understand the present invention, and appreciate its practical applications, the following figures are provided and referenced hereafter. It should be noted that the figures are given as examples only and in no way limit the scope of the invention. Like components are denoted by like reference numerals.

DETAILED DESCRIPTION OF EMBODIMENTS OF THE INVENTION

In the following detailed description, numerous specific details are set forth in order to provide a thorough understanding of the methods and systems. However, it will be understood by those skilled in the art that the present methods and systems may be practiced without these specific details. In other instances, well-known methods, procedures, and components have not been described in detail so as not to obscure the present methods and systems.

Although the examples disclosed and discussed herein are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method examples described herein are not constrained to a particular order or sequence. Additionally, some of the described method examples or elements thereof can occur or be performed at the same point in time.

Unless specifically stated otherwise, as apparent from the following discussions, it is appreciated that throughout the specification, discussions utilizing terms such as "adding", "associating" "selecting," "evaluating," "processing," "computing," "calculating," "determining," "designating," "allocating" or the like, refer to the actions and/or processes of a computer, computer processor or computing system, or similar electronic computing device, that manipulate, execute and/or transform data represented as physical, such as electronic, quantities within the computing system's registers and/or memories into other data similarly represented as physical quantities within the computing system's memories, registers or other such information storage, transmission or display devices.

According to some embodiments of the present invention system and method for formal verification of an MCP circuit is provided.

Figure 1:
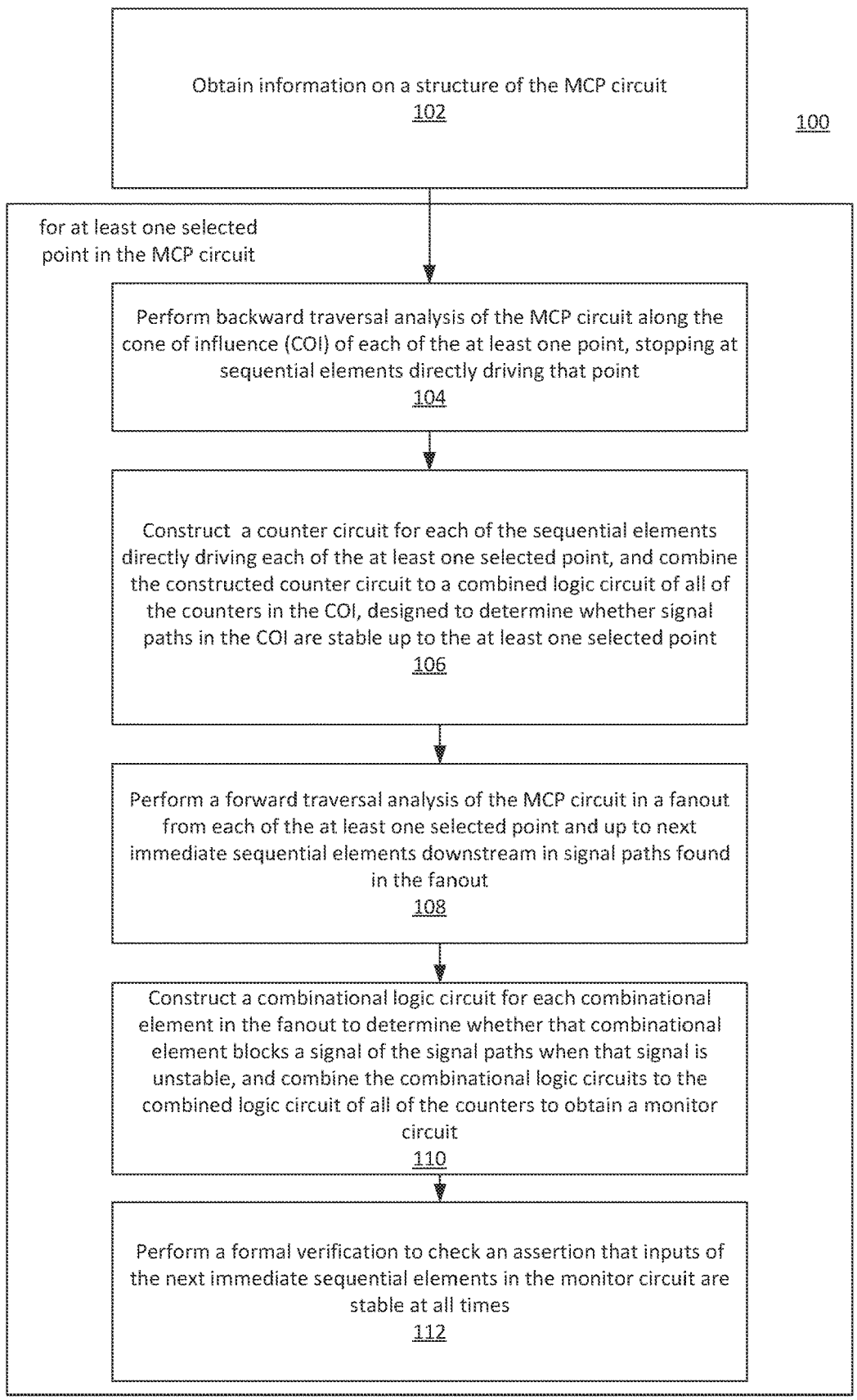
FIG. 1 depicts a method for formal verification of an MCP circuit, according to some embodiments of the present invention.

FIG. 1 depicts a method 100 for formal verification of an MCP circuit, according to some embodiments of the present invention.

Method 100 may include obtaining 102 information on a structure of the MCP circuit. Method 100 may also include, for at least one selected point in the MCP circuit: performing 104 backward traversal analysis of the MCP circuit along the cone of influence (COI) of the at least one point stopping at sequential elements directly driving that point. "Directly driving" means that there is no intervening sequential element between the selected point and a sequential element upstream a signal path of the COI that is identified as directly driving that point.

Method 100 may also include constructing 106 a counter circuit for each of the sequential elements directly driving each of the at least one selected point, and combining the constructed counter circuits to a combined logical circuit of all of the counters in the COI, designed to determine whether signal paths in the COI are stable up to the at least one selected point; performing 108 a forward traversal analysis of the MCP circuit in a fanout from each of the at least one selected point and up to next immediate sequential elements downstream in signal paths found in the fanout. "The next immediate sequential elements" are sequential elements in the signal paths of the fanout of the at least one selected point, with no other sequential elements in between.

Method 100 may also include constructing 110 a combinational logic circuit for each combinational element in the fanout to determine whether that combinational element blocks a signal of the signal paths when that signal is unstable, and combining the combinational logic circuits to the combined combinational logic circuit of all of the counters in the COI to obtain a monitor circuit; and performing 112 a formal verification to check an assertion that inputs of the next immediate sequential elements of the monitor circuit are stable at all times.

Some embodiments of the present invention are hereinafter described with reference to examples shown in the appended figures.

For any point in an electronic design that need verifying a formal verification method may include the following:

An electronic design automation (EDA) tool may be configured, for any point in the DUT, to perform backward traversal analysis to identify all combinational elements in the cone of influence (COI) of that point reaching down to the sequential elements that drive their signals to that point. For each sequential element identified in the COI of that point, the EDA is configured to automatically construct, based on the structure of the DUT which is provided to the EDA (e.g., by a user), a logic circuit of a counter for each sequential element in the COI of that point, and a logic circuit for all counters based on the signal flow from the sequential elements to the point, to determine whether the sequential elements in the COI are stable. It may be possible to assume that the sequential elements are not always stable, provided that when unstable the DUT is properly configured to block any sampling from unstable elements in the DUT. The EDA tool may further be configured to perform fan out (FO) traversal, to identify and automatically construct a logic circuit for each of the combinational elements in the possible logic flow paths from that point and up to the next sequential elements, to determine whether the DUT is properly designed to block unstable elements in the DUT. For each combination element in the FO, and up to the next sequential element in each signal path in the FO, a circuit is automatically constructed to determine whether that element allows a signal from stable outputs downstream to pass and blocks signals from unstable outputs. When completed an auxiliary circuit (monitor circuit) is obtained that comprises all of the circuits of the counters relating to the combinational elements in the COI and logic circuits of the combinational elements in the FO leading to the next sequential elements. Then, an assertion can be formally checked, asserting that all inputs of the sequential elements at the end of the FO are always stable. If this is true then the DUT can be considered as verified up to that point.

According to some embodiments of the present invention, an EDA tool may construct an auxiliary circuit design (hereinafter: the monitor circuit), for example, in a register transfer level (RTL) language, (e.g., Verilog, VHDL), for monitoring the stability of signals in a MCP circuit.

According to some embodiments of the present invention, in the process of constructing the monitor circuit, for each sequential element of the MCP circuit (hereinafter MCE) the EDA performs backward traversal analysis on the DUT, to identify the Sequential Elements (SEs) in the COI of that MCE. For each of the identified SEs a counter may be designed, which is configured to count clock cycles during which the output of that SE needs to be stable (e.g., the minimal number of clock cycles required by that output to be stable). The counter may be configured to facilitate counting for up to a predetermined number of cycles during which the SE to which that counter is assigned is required to remain stable.

In the case of a plurality of SEs in a certain COI, which are expected to remain stable for different number of clock cycles, the counter for each SE in that COI may be configured to count up to the highest number of clock cycles which the design dictates for any SE in that COI. Whenever the output data for any particular SE changes the counter for that SE resets to zero.

According to some embodiments of the present invention, in the process of constructing the monitor circuit, for each combinational element in the fanout FOE of the MCE the EDA tool may perform forward traversal analysis into the fanout from that element to identify the FOEs that receive signals from that MCE and identify all combinational elements in between. The forward traversal stops at the next sequential elements.

According to some embodiments of the present invention, in the process of constructing a section of the monitor circuit relating to the forward traversal in the fanout, the EDA tool may further add to the monitor circuit a component for each combinational element in the fanout, which outputs one value (e.g., "1") if that combinational element is stable for a predetermined number of clock cycles, or another value (e.g., "0") if that combinational element is not stable for that predetermined number of clock cycles. This way it may be determined whether that combinational element is properly stable as required.

For each identified combinational element, the EDA may add a logic circuit to the monitor circuit which serves to determine whether the output of that combinational element is either stable or blocked. For example, a path may be considered to be blocked in various types of gates as follows:

| Gate type | Blocked input pin type | Blocking input pin type | Blocking input pin value |
| --- | --- | --- | --- |
| AND | regular | regular | 0 |
| OR | regular | regular | 1 |
| NAND | regular | regular | 0 |
| NOR | regular | regular | 1 |
| MUX | data | selector | Doesn't select the input pin to be blocked |

According to some embodiments of the present invention, for a given synchronous circuit with an MCP design, the EDA tool is configured to construct a monitor circuit aimed at checking that for every sequential element of the DUT the setup and hold times are respected at every reachable state.

The inputs that may be considered are: the electronic circuit DUT, a list of signals that are expected to get stable over more than one clock cycle, with the number of clock cycles needed for each such signal to stabilize. The signals in the list may be referred to as Multi Cycle Element (MCE). The number of cycles an MCE E need to stabilize may be denoted NC(E).

According to some embodiments of the present invention a method for formal verification of an MCP circuit may include, using an EDA tool, automatically constructing a monitor circuit model (e.g., an RTL monitor model) for tracking the stability of some of the circuit signals.

The construction of the monitor model may include, for each MCE, performing a backward traversal analysis from that MCE to identify the sequential elements that drive that MCE (the sequential elements found from MCE E may be denoted COI(E)), and for each sequential element SE in COI(E), creating the following logic in the monitor model: (i) a tracking uninitialized flip flop FD, which is clocked on every clock edge, and whose input pin is connected to the output pin of SE; (ii) a counter CNT(SE) counts clock cycles as long as the data at the output of FD is the same as the output of SE, increasing the counter value up to NC(E), and that resets to zero when the data at the output of FD is not equal to SE. In case that SE is in the COI of more than one MCE, the counter is configured to count up to the maximal NC of the MCEs in that COI.

The construction of the monitor model may further include, for each MCE E, creating a logic component ST(E) that represent a conjunction of terms (CNT(SE)=NC(E)) for all the elements in COI(E): $ST(E) = AND_{SE \in COI(E)}$ (CNT(SE)=NC(E))

The construction of the monitor model may further include, for each MCE E, performing forward traversal analysis of combinational elements in the fanout of E. This may include denoting FO(E) the set of combinational elements in the fanout of E, denoting FOB(E) the subset of FO(E), such that an element is in FOB(E), if it is in FO(E) and its output port is connected to an input port of a sequential element. The construction of the monitor model may further include, for each element FO(E2) in the fanout, creating the logic ST(E2) as follows: (i) ST(E2)=1 if one of the following holds: Every driving port D of PO(E2) has ST (D)=1; (ii) FO(E) is a blocking gate as defined in Table 1, and the blocking port B has ST (B)=1 and all input ports IP that are not blocked have ST (IP)=1. An input port IP that is not in FO(E) for any MCE, is always considered to have ST (IP)=1.

According to some embodiments of the present invention, the method further includes creating an assert that always requires all elements in FOB(E) of all MCE elements to be 1. Then, formal verification technique is used to check that assert. If the assert is held valid the MCP design may be declared correct.

Figure 2:
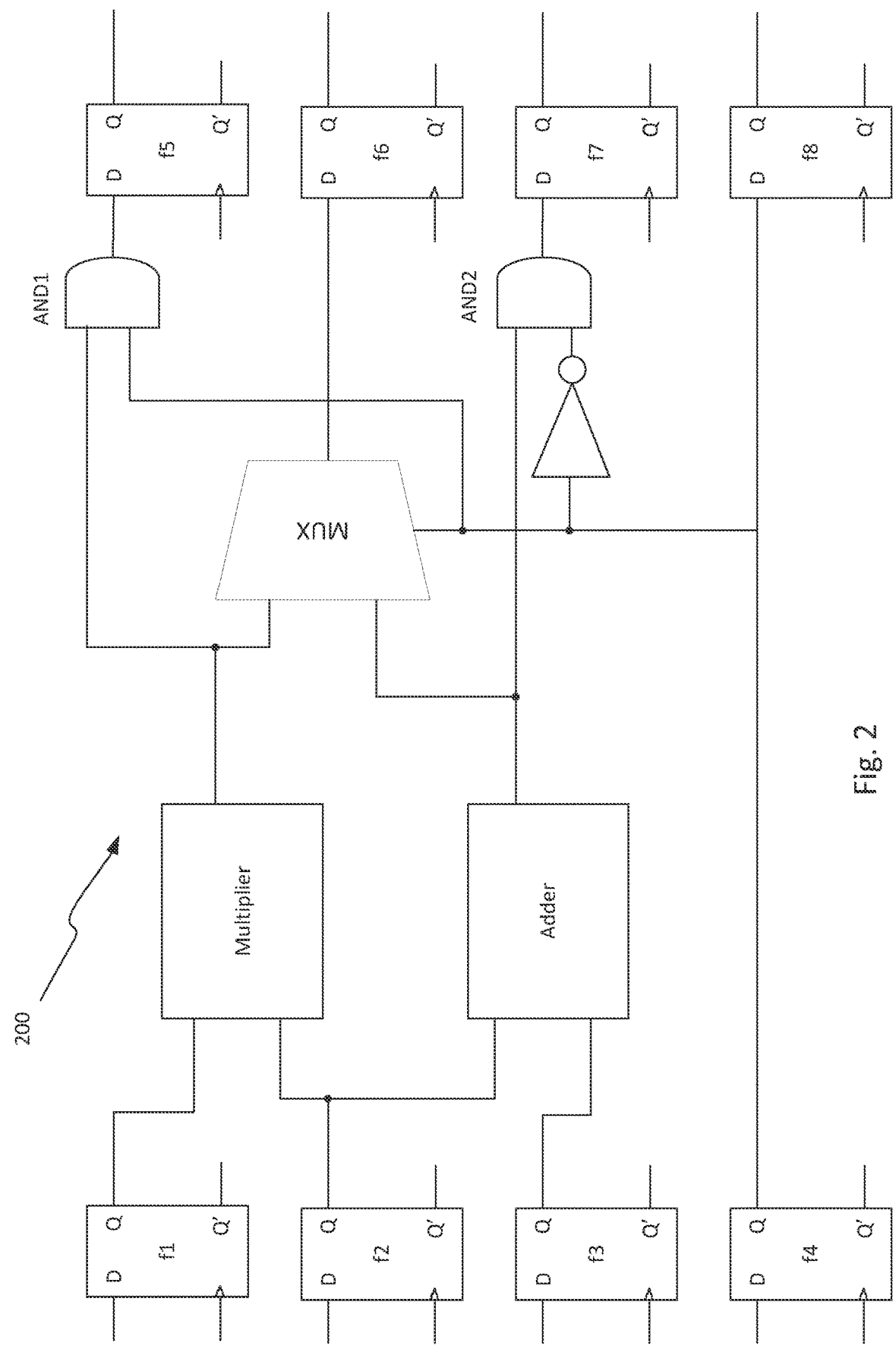
FIG. 2 is a diagram of an MCP circuit to be verified (DUT), according to some embodiments of the present invention.

FIG. 2 shows another electrical MCP circuit DUT 200, according to some embodiments of the present invention.

For MCP circuit 200 the list of signals that are expected to be stable after more than one clock cycle includes Multiplier (2 cycles) and Adder (1 cycle).

Figure 3:
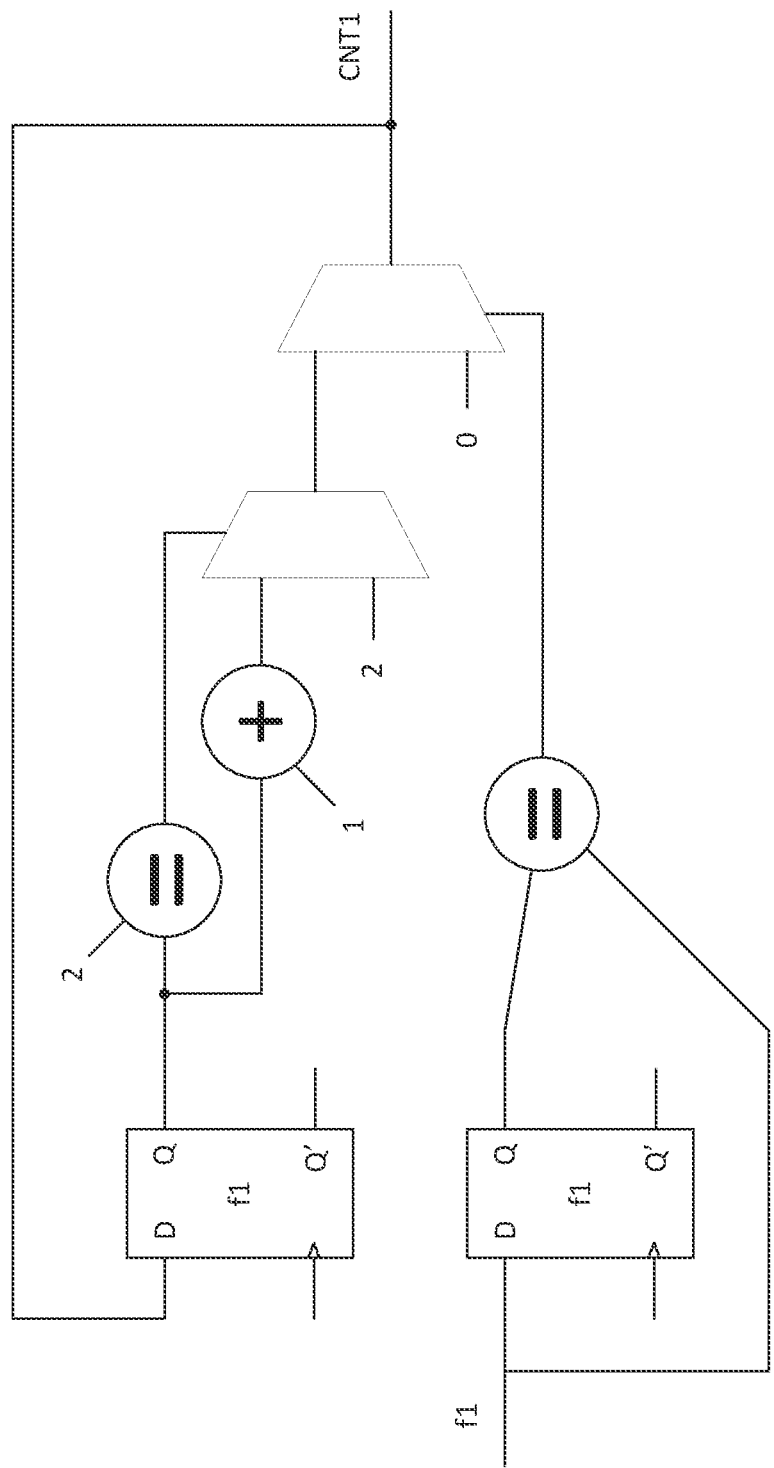
FIG. 3 is an automatically constructed counter circuit CNT1 corresponding to flip-flop f1 of FIG. 2, constructed by performing a backward traversal within the cone of influence (COI) from a selected point (the Multiplier) in the design of FIG. 2, according to some embodiments of the present invention.
Figure 4A:
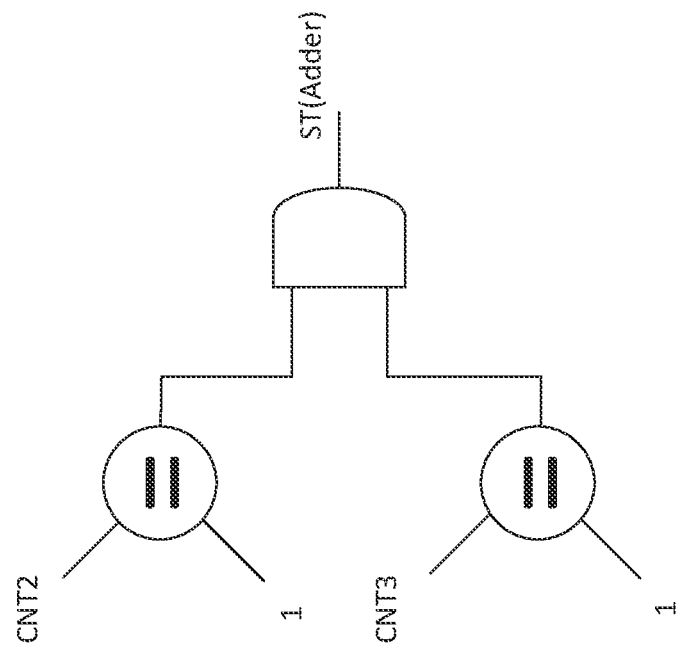
FIG. 4A is an automatically constructed circuit denoted ST (Multiplier), for determining stability of the signal from the Multiplier, constructed by performing forward traversal into the fanout from the selected point (the Multiplier) in the design of FIG. 2, according to some embodiments of the present invention.
Figure 4B:
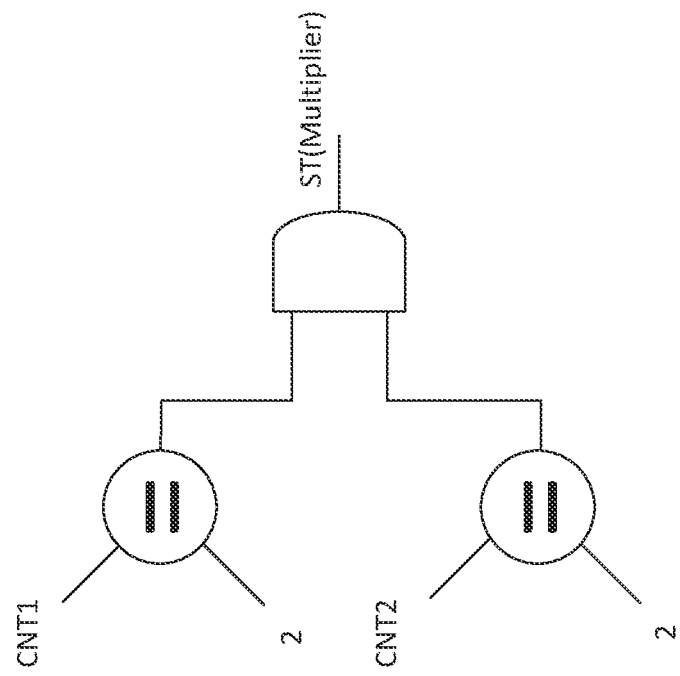
FIG. 4B is an automatically constructed circuit denoted ST (Adder), for determining stability of the signal from that point, constructed by performing forward traversal into the fanout from another selected point (the Adder) in the design of FIG. 2, according to some embodiments of the present invention.

Then, by performing backward traversal analysis from Multiplier and from Adder, it may be determined that the COI of Multiplier includes f1 and f2, and the COI of Adder includes f2 and f3. The fan out (FO) for Multiplier may discover FOB (Multiplier)={AND1, mux}, FO of Adder includes FOB (Adder)={AND2, mux}. Counters CNT1, CNT2, CNT3 may be assigned to each of flipflops f1, f2, f3. For CNT1, CNT2 are configured to count up to 2, and CNT3 is configured to count up to 1. The EDA tool may construct, based on the structure of the MCP DUT a circuit for CNT1, as shown in FIG. 3, and a circuit for ST (Multiplier) and ST (Adder), which are shown in FIG. 4A and FIG. 4B, respectively.

Figure 5B:
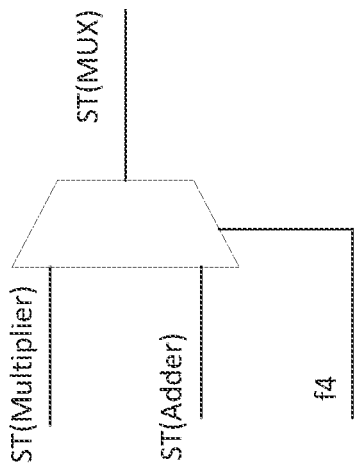
FIG. 5B is a reduced circuit for ST (MUX) of FIG. 5A, according to some embodiments of the present invention.
Figure 5D:
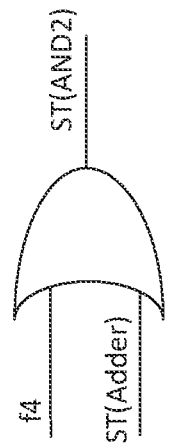
FIG. 5D is an automatically constructed circuit logic denoted ST(AND2), for determining stability of the signal at the AND2 gate component, constructed by performing forward traversal into the fanout from the selected points (the Multiplier and the Adder) in the design of FIG. 2, according to some embodiments of the present invention.
Figure 5A:
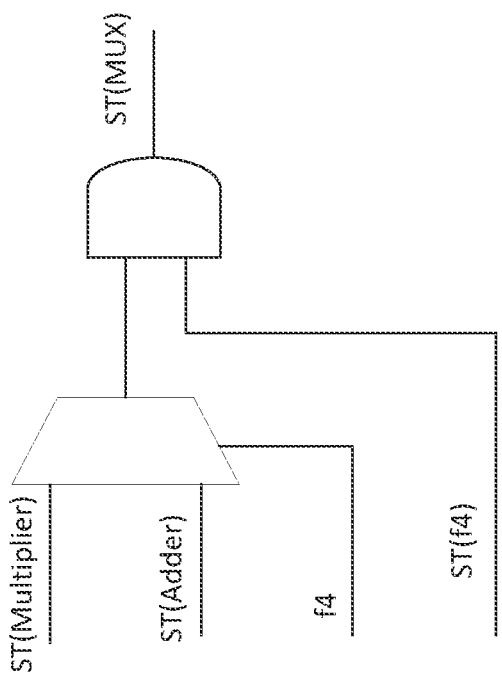
FIG. 5A is an automatically constructed circuit denoted ST (MUX), for determining stability of the signal at the multiplexer (MUX) component, constructed by performing forward traversal into the fanout from the selected points (the Multiplier and the Adder) in the design of FIG. 2, according to some embodiments of the present invention.

A full construction of the automatically constructed logic circuit for ST(mux) is shown in FIG. 5A. However, Since ST(f4) is constant (1), a reduced logic circuit of ST (MUX) shown in FIG. 5B may be used.

Figure 5C:
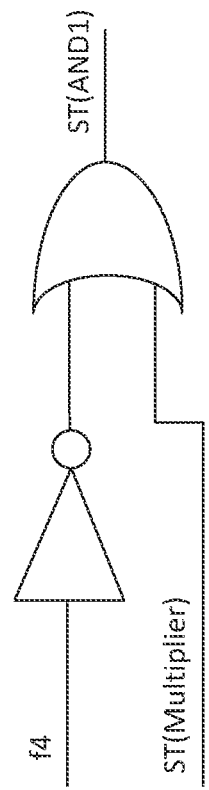
FIG. 5C is an automatically constructed circuit logic denoted ST(AND1), for determining stability of the signal at the AND1 gate component, constructed by performing forward traversal into the fanout from the selected points (the Multiplier and the Adder) in the design of FIG. 2, according to some embodiments of the present invention.
Figure 6:
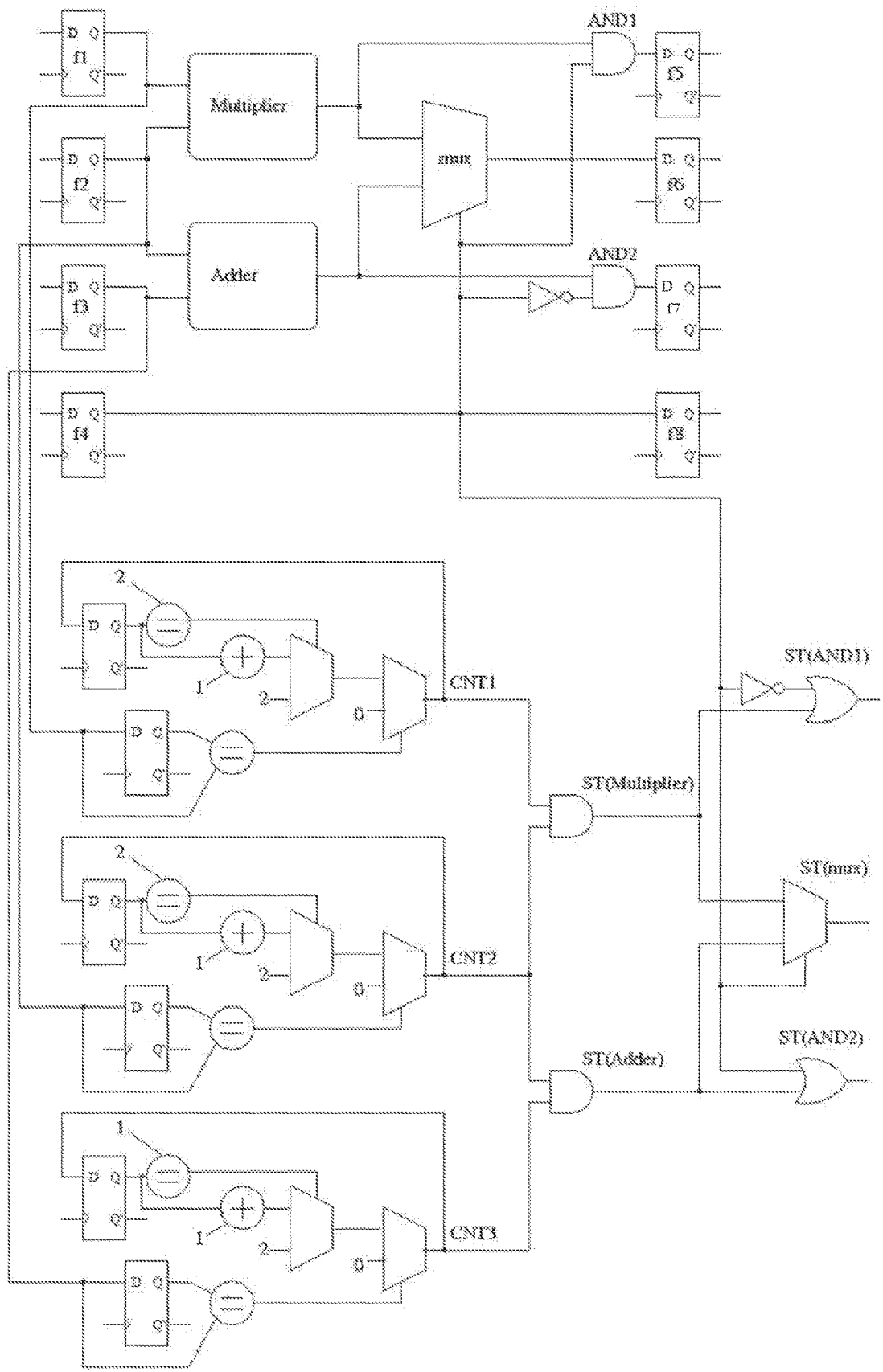
FIG. 6 is an auxiliary circuit design that is constructed by combining the constructed circuits from the backward traversal in the COI and forward traversal into the fanout, and linked to the DUT design, according to some embodiments of the present invention.

The automatically constructed logic circuit for ST(AND1) is shown in FIG. 5C and the automatically constructed logic circuit for ST(AND2) is shown in FIG. 5D.

When the monitor circuit is completed a formal verification process may be performed applying an assert that need to be formally checked. In the example discussed hereinabove, an assertion may be presented for checking using a formal verification tool, for example, in the following form: assert property (@(posedge clk) ST(mux) && ST(AND1) && ST(AND2)); where clk is the clock of the circuit.

If the assertion fails, a debugger tool may be used to trace back the instability trail, selecting signals E with ST(E)=0.

Figure 7:
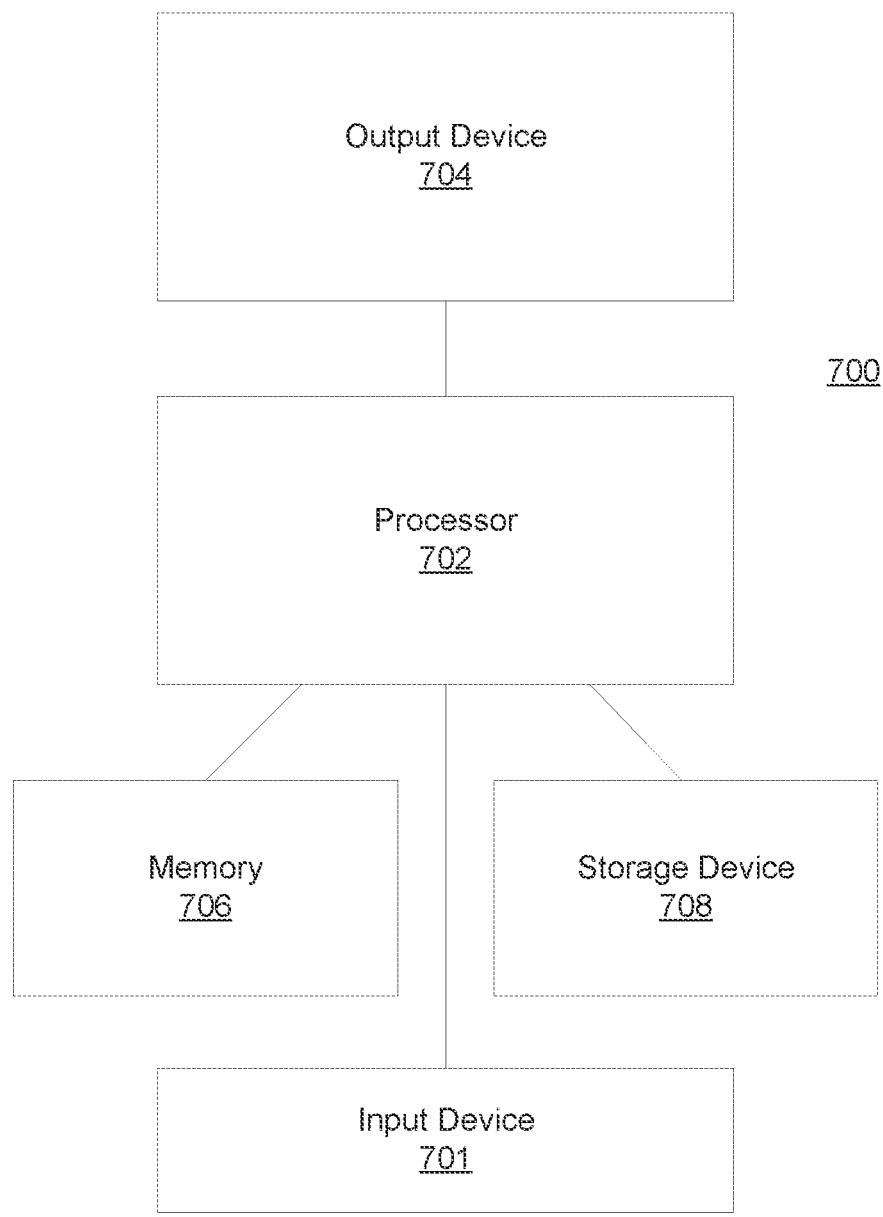
FIG. 7 is a block diagram of a system for formal verification of an MCP circuit, according to some embodiments of the invention.

FIG. 7 is a block diagram of a system 700 for formal verification of an MCP circuit according to some embodiments of the invention. System 700 may include a processor 702 (e.g. single processor or a processing unit made that includes a plurality of processors, on a single machine or distributed on a plurality of machines) for executing a method according to some embodiments of the present invention.

Processor 702 may be linked with memory 706 on which a program implementing a method according to some embodiments of the present invention and corresponding data may be loaded and run from, and storage device 708, which includes a non-transitory computer readable medium (or mediums) such as, for example, one or a plurality of hard disks, flash memory devices, etc. on which a program implementing a method according to some embodiments of the present invention and corresponding data may be stored. System 700 may further include an output device 704 (e.g. display device such as CRT, LCD, LED etc.) on which one or a plurality user interfaces associated with a program implementing a method according to some embodiments of the present invention and corresponding data may be presented. System 700 may also include input interface 701, such as, for example, one or a plurality of keyboards, pointing devices, touch sensitive surfaces (e.g. touch sensitive screens), etc. for allowing a user to input commands and data.

Some embodiments of the present invention may be embodied in the form of a system, a method or a computer program product. Similarly, some embodiments may be embodied as hardware, software or a combination of both. Some embodiments may be embodied as a computer program product saved on one or more non-transitory computer readable medium (or media) in the form of computer readable program code embodied thereon. Such non-transitory computer readable medium may include instructions that when executed cause a processor to execute method steps in accordance with examples. In some examples the instructions are stored on the computer readable medium may be in the form of an installed application and in the form of an installation package.

Such instructions may be, for example, loaded by one or more processors and get executed.

For example, the computer readable medium may be a non-transitory computer readable storage medium. A non-transitory computer readable storage medium may be, for example, an electronic, optical, magnetic, electromagnetic, infrared, or semiconductor system, apparatus, or device, or any combination thereof.

Computer program code may be written in any suitable programming language. The program code may execute on a single computer system, or on a plurality of computer systems.

Some embodiments are described hereinabove with reference to flowcharts and/or block diagrams depicting methods, systems and computer program products according to various embodiments.

Features of various embodiments discussed herein may be used with other embodiments discussed herein. The foregoing description of the embodiments has been presented for the purposes of illustration and description. It is not intended to be exhaustive or limiting to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes that fall within the true spirit of the present invention.

The invention claimed is:

1. A method for formal verification of a multi cycle path (MCP) circuit, the method comprising:
   obtaining information on a structure of a MCP circuit;
   for at least one selected point in the MCP circuit:
   performing backward traversal analysis of the MCP circuit along the cone of influence (COI) of each of the at least one selected point stopping at sequential elements directly driving that point;
   constructing a counter circuit for each of the sequential elements directly driving the at least one selected point, and combining the constructed counter circuits to a combined logic circuit of all of the counters in the COI, designed to determine whether signal paths in the COI are stable up to the at least one selected point;
   performing a forward traversal analysis of the MCP circuit in a fanout from each of the at least one selected point and up to next immediate sequential elements downstream in signal paths found in the fanout;
   constructing a combinational logic circuit for each combinational element in the fanout to determine whether that combinational element blocks a signal of the signal paths when that signal is unstable, and combining the combinational logic circuits to the combined logic circuit of all of the counters in the COI of said at least one selected point to obtain a monitor circuit; and
   performing a formal verification to check an assertion that inputs of the next immediate sequential elements of the monitor circuit are stable at all times.

2. The method of claim 1, wherein the counter circuit for each of the sequential elements directly driving the at least one selected point is configured to count a minimal number of clock cycles that sequential element requires to be stable.

3. The method of claim 1, wherein the counter circuit for each of the sequential elements directly driving the at least one selected point is configured to count up to a highest a minimal number of clock cycles of a minimal number of clock cycles any of the sequential elements in the COI require to be stable.

4. The method of claim 1, wherein the sequential elements are flipflops.

5. The method of claim 1, wherein combining the constructed counter circuits to a combined logical circuit comprises creating a logic component ST(E) that represent a conjunction of terms (CNT(SE)=NC(E)) for all elements in COI(E): ST(E)=$AND_{SE \ni COI(E)}$ (CNT(SE)=NC(E)), wherein COI.

6. The method of claim 1, wherein combining the combinational logic circuits to the monitor circuit comprises denoting FO(E) the set of combinational elements in the fanout of element E, denoting FOB(E) a subset of FO(E), such that an element is in FOB(E), if that element is in FO(E) and an output port of that element is connected to an input port of a sequential element.

7. The method of claim 6, further comprising for each element E2 in FO(E), creating a logic circuit ST(E2) as follows: (i) ST(E2)=1 if one or more of the following exists: every driving port D of FO(E2) has ST (D)=1; (ii) FO(E2) is a blocking gate, and the blocking port denoted B has ST (B)=1 and all input ports that are not blocked have ST (IP)=1.

8. The method of claim 6, comprising creating an assertion that always requires all elements in FOB(E) for all sequential elements of the MCP circuit to be 1.

9. The method of claim 1, wherein said at least one selected point comprises a plurality of points.

10. A system comprising:
memory and
a processor configured to:
for at least one selected point in an MCP circuit:
perform backward traversal analysis of a design of the MCP circuit along the cone of influence (COI) of each of the at least one selected point stopping at sequential elements directly driving that point;
construct a counter circuit for each of the sequential elements directly driving the at least one selected point, wherein the counter circuit for each of the sequential elements directly driving that point is configured to count a minimal number of clock cycles that sequential element requires to be stable, and combine the constructed counter circuits to a combined logic circuit of all of the counters in the COI, designed to determine whether signal paths in the COI are stable up to the at least one selected point;
perform a forward traversal analysis of the MCP circuit in a fanout from each of the at least one selected point and up to next immediate sequential elements downstream in signal paths found in the fanout;
construct a combinational logic circuit for each combinational element in the fanout to determine whether that combinational element blocks a signal of the signal paths when that signal is unstable, and combine the combinational logic circuits to a combined combinational logic circuit of all of the counters in the COI of said at least one selected point to obtain a monitor circuit; and
perform a formal verification to check an assertion that inputs of the next immediate sequential elements of the monitor circuit are stable at all times.

11. The system of claim 10, wherein the counter circuit for each of the sequential elements directly driving the at least one selected point is configured to count a minimal number of clock cycles that sequential element requires to be stable.

12. The system of claim 10, wherein the counter circuit for each of the sequential elements directly driving the at least one selected point is configured to count up to a highest a minimal number of clock cycles of aa minimal number of clock cycles any of the sequential elements in the COI require to be stable.

13. The system of claim 10, wherein the processor is also configured to obtain information on a structure of the MCP circuit.

14. The system of claim 10, wherein the sequential elements are flipflops.

15. The system of claim 10, wherein the counter circuit for each of the sequential elements directly driving that point is configured to count up to a highest a minimal number of clock cycles of a minimal number of clock cycles any of the sequential elements in the COI require to be stable.

16. The system of claim 10, wherein said at least one selected point comprises a plurality of points.

17. A non-transitory computer readable storage medium for formal verification of a multi cycle path (MCP) circuit, having stored thereon instructions that when executed by a processor will cause the processor to:
for at least one selected point in an MCP circuit:
perform backward traversal analysis of a design of the MCP circuit along the cone of influence (COI) of each of the at least one selected point stopping at sequential elements directly driving that point;
construct a combined logical circuit of counter circuits for each of the sequential elements directly driving the at least one selected point, wherein each of the counter circuit relates to one of a plurality of sequential elements directly driving that point, configured to count a minimal number of clock cycles that sequential element requires to be stable, the combined logical circuit being designed to determine whether signal paths in the COI are stable up to the selected point;
perform a fan out traversal analysis of the MCP circuit from the selected point and up to next immediate sequential elements downstream in signal paths found in the fan out traversal;
construct a combined combinational logic circuit of combinational logic circuits for each combinational element in the signal paths found in the fan out traversal to determine whether that combinational element blocks a signal of the signal paths when that signal is unstable; and
perform a formal verification to check an assertion that inputs of the next immediate sequential elements are stable at all times.

18. The non-transitory computer readable storage medium of claim 17, wherein the counter circuit for each of the sequential elements directly driving that point is configured to count a minimal number of clock cycles that sequential element requires to be stable.

19. The non-transitory computer readable storage medium of claim 17, wherein the counter circuit for each of the sequential elements directly driving that point is configured to count up to a highest a minimal number of clock cycles of aa minimal number of clock cycles any of the sequential elements in the COI require to be stable.

20. The non-transitory computer readable storage medium of claim 17, having stored thereon instructions that when executed by a processor will cause the processor to obtain information on a structure of the MCP circuit.

* * * * *